United States Patent
Balint et al.

(10) Patent No.: US 6,171,095 B1
(45) Date of Patent: Jan. 9, 2001

(54) MULTIPLE AXES ELECTROFORM

(75) Inventors: Gregory J. Balint, Windsor; Michael Cassidy, Amherstburg, both of (CA)

(73) Assignee: Hallmark Technologies, Inc., Windsor (CA)

(*) Notice: Under 35 U.S.C. 154(b), the term of this patent shall be extended for 0 days.

(21) Appl. No.: 09/100,059

(22) Filed: Jun. 19, 1998

(51) Int. Cl.[7] .................................................. B29D 11/00
(52) U.S. Cl. ......................... 425/195; 249/104; 249/140; 249/155; 264/2.5; 425/808
(58) Field of Search ..................... 264/1.9, 2.5; 249/140, 249/141, 102, 104, 155; 425/195, 193, 183, 808

(56) References Cited

U.S. PATENT DOCUMENTS

| | | | |
|---|---|---|---|
| 1,591,572 | * 6/1926 | Stimson | 264/1.9 |
| 2,538,638 | * 1/1951 | Wilson | 249/104 |
| 3,069,721 | * 12/1962 | Arni et al. | 425/470 |
| 3,258,840 | * 7/1966 | Hedgewick et al. | 264/2.5 |
| 3,277,535 | * 10/1966 | Rupert | 425/DIG. 30 |
| 3,417,959 | * 12/1968 | Schultz | 425/DIG. 30 |
| 3,443,281 | * 5/1969 | Walby | 425/DIG. 30 |
| 3,811,647 | 5/1974 | Pink . | |
| 3,851,947 | 12/1974 | Montgomery . | |
| 3,887,268 | 6/1975 | Golden et al. . | |
| 3,893,747 | 7/1975 | Nagel . | |
| 3,894,786 | 7/1975 | Nagel . | |
| 3,894,790 | 7/1975 | Golden et al. . | |
| 3,895,855 | 7/1975 | Nagel . | |
| 3,905,680 | 9/1975 | Nagel . | |
| 3,905,681 | 9/1975 | Nagel . | |
| 3,948,714 | * 4/1976 | Steiner et al. | 264/2.5 |
| 3,957,616 | 5/1976 | Montgomery . | |
| 3,972,586 | 8/1976 | Arnott et al. . | |
| 4,243,618 | * 1/1981 | Van Arnham | 264/2.5 |
| 4,478,769 | * 10/1984 | Pricone et al. | 264/2.5 |
| 4,733,946 | 3/1988 | Cossetti . | |
| 5,034,867 | 7/1991 | Mayer . | |
| 5,565,221 | 10/1996 | Caroli . | |
| 5,610,762 | 3/1997 | Caroli . | |
| 5,657,169 | 8/1997 | Caroli . | |
| 5,770,120 | * 6/1998 | Kamihara et al. | 264/2.5 |

FOREIGN PATENT DOCUMENTS 0790 120 A2   8/1997  (EP) .

* cited by examiner

*Primary Examiner*—Duane S. Smith
(74) *Attorney, Agent, or Firm*—Harness, Dickey & Pierce, P.L.C.

(57) ABSTRACT

A multiple axes electroform is created by first locating a plurality of reflex or optical pins and a mold matrix that extends generally parallel to a first axis. A second mold matrix is created by loading into a fixture yet another set of pins that are generally parallel to a second axis. Electroforms are then made from each mold matrix. The resulting electroforms are then placed into yet another fixture whereby a third electroform is made. The third electroform is then placed into a final fixture where a master electroform is made which will be used in the tooling that is used to injection mold the final automotive lens assembly.

6 Claims, 2 Drawing Sheets

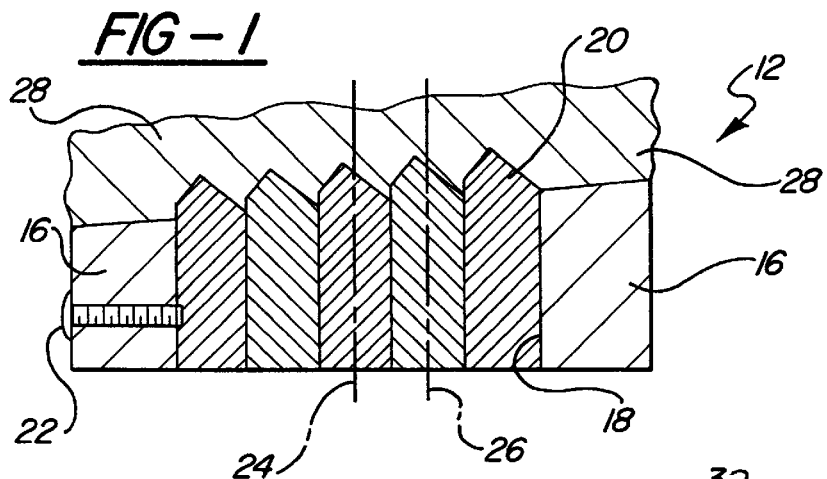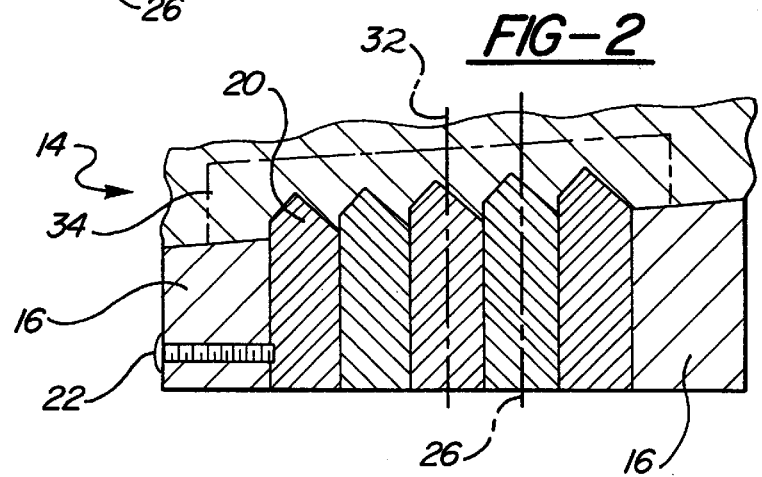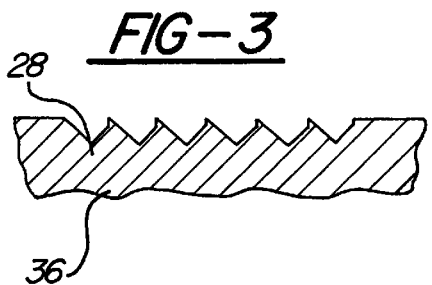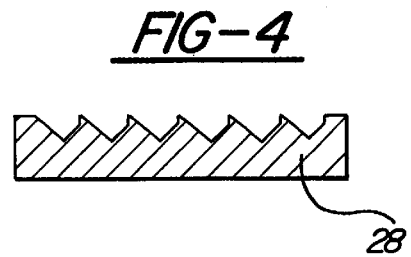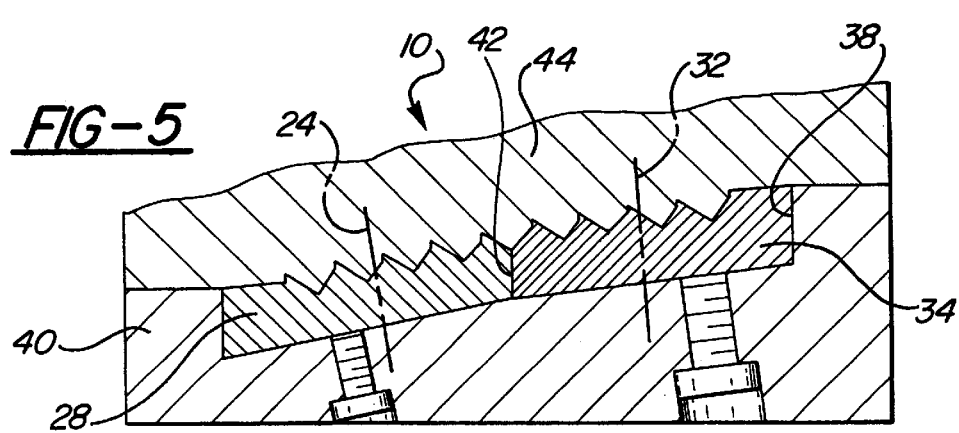

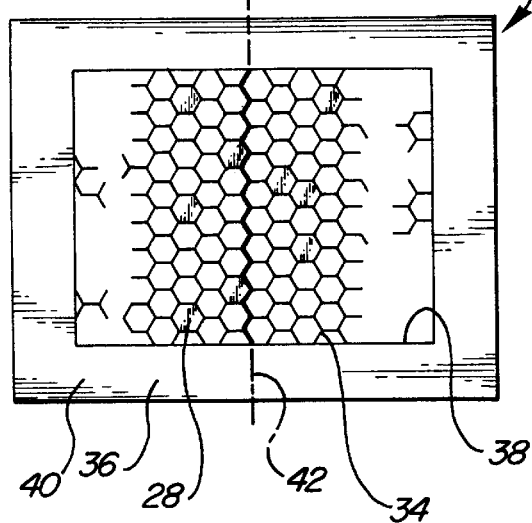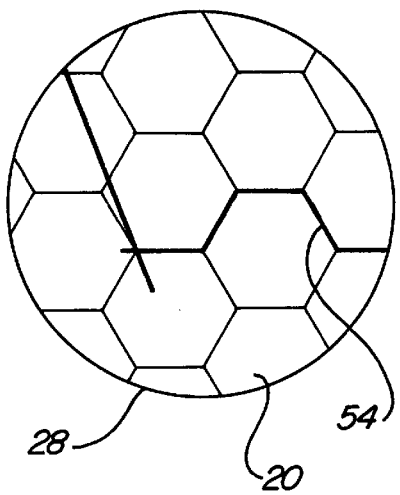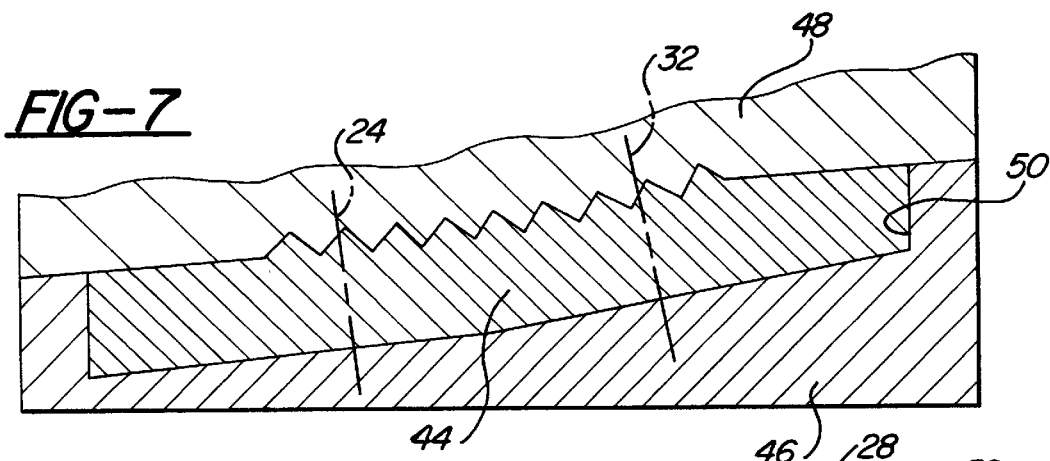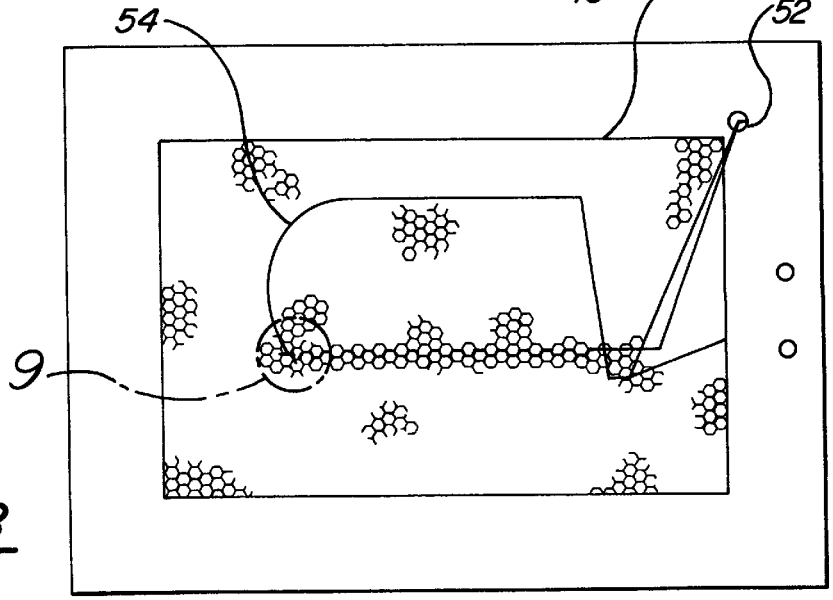

MULTIPLE AXES ELECTROFORM

FIELD OF THE INVENTION

This invention relates to a multiple axes electroform for use in connection with contoured or flat retro-reflector lens molds that are used to create plastic lens assemblies.

BACKGROUND AND SUMMARY OF THE INVENTION

It has been proposed in the past to coordinate an array of reflex pins into a particular arrangement in order to make a reflective mold matrix. The resulting matrix is used to make an electroform block through the electroplating process. The electroform block is subsequently used to create an insert tool for a mold that is used in injection molding to make optical and reflective vehicle light assemblies. Optic or reflex pins are set in the mold matrix to create a plurality of reflective prisms for emitting an array of light from a specified part of the vehicle light assembly. Such light assemblies are often used in automotive front and rear lens assemblies.

Historically light assemblies for vehicles were located on the flat surfaces of the vehicle. Existing reflective mold matrix technology was accustomed to working primarily with flat surfaces. Because automobiles have become more aerodynamic, there is a need to produce vehicle light assemblies that are contoured to match the configuration of the vehicle body. Such light assemblies need to provide optimum reflectivity and comply with industry optical standards. Thus, there is a need to provide an improved reflective mold matrix comprised of numerous reflex pin axes that allow a uniform look with segregated areas of varying light distributions over a wide set of observation angles.

Accordingly, it is desirable to provide a molding tool comprised of a multiple axes electroform that is used to manufacture a light assembly having a uniform look of reflective segments. It is further desirable to create a molding tool that produces light assemblies having varying light distributions over a wide set of observation angles of the light assembly. It is also desirable to employ a unique process of manufacturing the molding tool or insert.

These and other various advantages and aspects of the present invention will become apparent from the following description and claims, in conjunction with the appended drawings.

BRIEF DESCRIPTION OF THE DRAWINGS

FIG. 1 is a side elevational view of an electroform plated to a fixture where hexagonal pins are loaded and set to the surface contour;

FIG. 2 is a side elevational view of a second electroform;

FIG. 3 is a side elevational view of the electroforms shown in FIGS. 1 and 2 once they have been removed from the fixture, but shown with the plating material buildup;

FIG. 4 is a side elevational view of the electroform shown in FIG. 3, but with the electroform machined to the correct thickness and angle;

FIG. 5 is a side elevational view of a mold matrix having two electroforms set into a fixture;

FIG. 6 is a top view of the FIG. 3 mold matrix where the split line between the two electroforms is apparent;

FIG. 7 is a side elevational view of a mold matrix where two electroforms have been joined to match the surface contour, but with the split line removed;

FIG. 8 is a top plan view of the FIG. 4 electroform showing the process of wire cutting an interlocking electroform; and FIG. 9 is an enlarged view of the FIG. 8 process showing cutting along the profile of the pin.

DETAILED DESCRIPTION OF THE PREFERRED EMBODIMENT

The following description of the preferred embodiment is merely exemplary in nature, and is in no way intended to limit the invention, or its application or uses.

With reference to the drawings, a multiple axes electroform is shown in the figures having a novel mold matrix assembly according to the present invention. The mold matrix assembly 10 depicted in the figures is comprised of a first matrix section 12 and a second matrix section 14. The first matrix section 12 includes a fixture 16 having a cavity 18 that is operable to receive a plurality of optical or reflex pins 20. Each pin 20 is elongated and has a hexagonal shape as viewed from the top plan view as depicted in FIG. 6. The distal end of each pin 20 has three faces similar to a prism. A contoured template (shown in phantom) defines the reflex surface on the interior surface of the automotive lens. The pins 20 are set within the fixture 16 to match the template which defines the surface contour of the desired automotive lens configuration. Once the pins 20 are set into their proper location, they are held in place in the fixture 16 by a mechanical means such as a fastener or pin 22. A first axis 24 of fixture 16 extends in a direction parallel to the longitudinal axis 26 of each pin 20. The first mold matrix 12 is now ready to be electroplated which results in a skin or a first electroform 28 being plated from fixture 16 and the pins 20.

With reference to FIG. 2, a second matrix section 14 is illustrated having a fixture 16 loaded with pins 20 which again are set to the surface contour of the desired automotive lens. The pins 20 are fixed in place by mechanical means 22. The second matrix 12 is then ready to be electroplated which results in another skin or second electroform 34 being created. The second electroform at this stage has buildup of the electroplating material and thus must be machined to a useable state.

The second matrix section 14 differs from the first matrix section 12 in that a second axis 30 extends substantially parallel to the pins 20 at an angle different from the axis 24. Thus, while only two matrix sections 12 and 14 are illustrated, it is contemplated that more than two matrix sections can be used in this invention to create a matrix electroform having a multitude of axes that are operable to vary light distributions over a very wide set of observation angles of the automotive lens.

FIG. 3 illustrates a side elevational view of the first electroform 28 once it has been pulled away from the fixture 16 and the pins 20. The electroplating process causes an excess buildup of nickel nodules 36 on the underside of the electroform. Each electroform 28 and 34 is preferably milled down to their correct pocket thickness and angle so that it will be properly seated within the pocket 38 of yet a third fixture 40. FIG. 4 is a side elevational view of electroform 28 shown after it has been machined to its proper configuration.

FIG. 5 illustrates the first electroform 28 and the second electroform 34 loaded into the pocket 38 of third fixture 40. First electroform 28 and second electroform 34 have been milled and wire cut to match a split line 42 that extends the entire width of the electroforms. A longitudinal axis 32 of the second electroform 34 is non-parallel to axis 24 of the first electroform 28. FIG. 6 illustrates a top plan view of the first electroform 28 and second electroform 34 loaded within fixture 40 with the readily apparent split line 42 exaggerated for illustration purposes. A third electroform 44 is made by electroplating electroforms 28 and 34 thus removing the split line. Once the third electroform 44 has been made it must be milled down to the correct thickness to ensure that it will fit into the pocket of the next fixture 46. The inverse of electroform 44 must now be made in order to obtain the finished insert tool 48.

With reference to FIG. 7, a third fixture 46 is illustrated with the third electroform 44 inverted and shown recessed within pocket 50. The electroform 44 is held in place by conventional fastening means to secure it to the fixture 46 during the plating process. This assembly is now electroplated to create a finished accurate shaped insert 48 having a continuous multi-axes. Prior to use, however, the finished insert 48 is preferably machined and wire cut to fit into the tooling that is used to injection mold the accurate shaped plastic automotive lens.

FIGS. 8 and 9 illustrate the electronic wire cutting process of carving out interlocking pieces of electroforms so that they match the desired configuration of the molding tool. This is important because to create large plastic molded parts using this reflex technology, it is preferred to interlock multiple electroforms together to make the final insert tool. To make these individual interlocking electroforms as shown in FIG. 8, an electroform 28 milled down to the correct pocket thickness as shown in FIG. 4 is wire cut. The wire cut machine starts at point 52 and travels along a predetermined path 54 until the resulting configuration has been cut out. FIG. 9 is an enlarged view of the electroform 28 and the path 54 which traverses along the outer profile of pins 20. This predetermined path 54 creates an interlocking feature which allows adjacently positioned electroforms, for example 28 and 34, to be interlocked along a split line 42. It will be appreciated that the wire cutting process is used to create a plurality of interlocking electroforms which are in turn used to make the completed finished tool 48.

It should be understood that an unlimited number of configurations of the present invention can be realized. The foregoing discussion discloses and describes merely exemplary embodiments of the present invention. One skilled in the art will readily recognize from the discussion and from the accompanying drawings and claims that various changes and modifications can be made without departing from the spirit and scope of the invention, as defined in the following claims.

What is claimed is:

1. A multiple axes insert for a tool to be used in manufacturing a mold used in injection molding arcuate shaped automotive lenses, the electroform comprising:
   a first matrix section positioned within a fixture and having a first axis, the first matrix section including pins, each pin having a major longitudinal axis that extends in a direction that is substantially parallel to the first axis;
   a second matrix section positioned within a second fixture and having a second axis, the second matrix section including pins, each pin having a major longitudinal axis that extends in a direction that is substantially parallel to the second axis;
   a first electroform created from the first matrix section;
   a second electroform created from the second matrix section;
   a third electroform created by combining and plating the first and second electroforms; and
   a fourth electroform created by plating the third electroform, wherein the fourth electroform is a continuous mold matrix for use in manufacturing a mold to make arcuate shaped automotive lenses having varying light distributions over a wide set of observation angles that create a multi-faceted appearance on an exterior surface of the automotive lens.

2. The multiple axes insert as claimed in claim 1 further comprising another electroform combined with the fourth electroform.

3. The multiple axes insert as claimed in claim 1 wherein the first electroform is machined along its perimeter to have a zig-zag profile.

4. The multiple axes insert as claimed in claim 1 wherein the second electroform is machined along its perimeter to have a zig-zag profile.

5. The multiple axes insert as claimed in claim 1 wherein the electroforms are machined to have a profile that allows the electroforms to interlock.

6. An insert tool for use in manufacturing a plastic lens comprising:
   a first electroform created from a first matrix section;
   a second electroform created from a second matrix section; wherein each electroform is on a separate axis, the first and second matrix sections are combined to from a continuous mold matrix for use in manufacturing a mold to make contoured shaped automotive lenses having multi-faceted exterior appearances and that vary light distributions over a wide set of observation angles.

* * * * *